(12) United States Patent
Waez et al.

(10) Patent No.: US 11,733,149 B2
(45) Date of Patent: Aug. 22, 2023

(54) MONITOR FOR ENVIRONMENTAL PARTICULATE MATTER SIZE, CONCENTRATION, AND COMPLEX INDEX OF REFRACTION

(71) Applicant: Kansas State University Research Foundation, Manhattan, KS (US)

(72) Inventors: Mir Seliman Waez, San Antonio, TX (US); Christopher Sorensen, Manhattan, KS (US); Steven Eckels, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 16/987,677

(22) Filed: Aug. 7, 2020

(65) Prior Publication Data

US 2021/0109008 A1 Apr. 15, 2021

Related U.S. Application Data

(60) Provisional application No. 62/913,462, filed on Oct. 10, 2019.

(51) Int. Cl.
*G01N 15/14* (2006.01)
*G01N 15/02* (2006.01)
*G01N 15/06* (2006.01)

(52) U.S. Cl.
CPC ..... *G01N 15/1434* (2013.01); *G01N 15/0211* (2013.01); *G01N 15/06* (2013.01);
(Continued)

(58) Field of Classification Search
None
See application file for complete search history.

(56) References Cited

U.S. PATENT DOCUMENTS

| 2002/0018204 A1* | 2/2002 | Sachweh | G01N 15/0211 356/338 |
| 2005/0243307 A1* | 11/2005 | Silcott | G01N 15/1459 356/73 |

(Continued)

OTHER PUBLICATIONS

Mir Seliman Waez, Steve J. Eckels & Christopher M. Sorensen (2018) A refractive-index and position-independent single-particle detector for large, nonabsorbing, spherical particles, Aerosol Science and Technology, 52:12, 1429-1436, DOI: 10.1080/02786826. 2018.1524133 (Year: 2018).*

(Continued)

*Primary Examiner* — Rufus L Phillips
(74) *Attorney, Agent, or Firm* — Hovey Williams LLP

(57) ABSTRACT

Apparatus and methods for determining particle size, and optionally, the complex index of refraction for particle suspended in a gas or liquid are provided. The particle to be analyzed is caused to travel through a laser beam having a modified Gaussian profile. The particle causes light from the laser beam to scatter. The scattered light is measured by one or more photodetectors disposed at a particular scattering angle relative to the center of the laser beam. The apparatus and methods can be used in sensors configured to monitor air quality in enclosed environments, such as on-board aircraft and within buildings, and/or detect environmental contaminants.

7 Claims, 12 Drawing Sheets

(52) U.S. Cl.
CPC ............ *G01N 2015/0693* (2013.01); *G01N 2015/1493* (2013.01)

(56) References Cited

U.S. PATENT DOCUMENTS

| | | | | |
|---|---|---|---|---|
| 2008/0037004 | A1* | 2/2008 | Shamir | G01N 15/1459 356/336 |
| 2010/0225913 | A1* | 9/2010 | Trainer | G01N 15/0205 356/338 |
| 2011/0116090 | A1* | 5/2011 | Fergenson | G01N 1/4022 356/336 |
| 2015/0260628 | A1* | 9/2015 | Shamir | G01N 15/1456 356/73 |
| 2016/0252443 | A1* | 9/2016 | Spriggs | G01N 15/1456 356/336 |
| 2017/0191923 | A1* | 7/2017 | Ling | G01N 15/1459 |
| 2020/0158615 | A1* | 5/2020 | Shi | G01N 15/1434 |
| 2020/0217775 | A1* | 7/2020 | Novosselov | G01N 15/1459 |

OTHER PUBLICATIONS

Waez, et al., "A refractive-index and position-independent single-particle detector for large, nonabsorbing, spherical particles", Aerosol Science and Technology, 2018; 52:12, 1429-1436.

Budde, et al., "Enabling Low-Cost Particulate Matter Measurement for Participatory Sensing Scenarios", Association for Computing Machinery, 2013;19.

Eidhammer, et al., "Determination of index of refraction and size of supermicrometer particles from light scattering measurements at two angles", J. Geophys. Res. 2018;113.

Kolgotin, et al., "Improved identification of the solution space of aerosol microphysical properties derived from the inversion of profiles of lidar optical data, part 2: simulations with synthetic optical data", Applied Optics 2016;55(34):9850-9865.

Pfeifer, et al., "A fast and easy-to-implement inversion algorithm for mobility particle size spectrometers considering particle number size distribution information outside of the detection range", Atmos. Meas. Tech. 2014;7:95-105.

Ren, et al., "Simultaneous retrieval of the complex refractive index and particle size distribution", Optics Express 2015;23(15).

Ren, et al., "A forward-angle-scattering method for the determination of optical constants and particle size distribution by collimated laser irradiation", Optics Communications 2017;389:258-264.

Sun, et al., "Retrieval of particle size distribution in the dependent model using the moment method", Optics Express 2007;15(18).

Ye, et al., "Inversion of particle-size distribution from angular light-scattering data with genetic algorithms", Applied Optics 1999;38(12):2677-2685.

Zarzana, et al., "Sensitivity of Aerosol Refractive Index Retrievals Using Optical Spectroscopy", Aerosol Science and Technology 2014;48(11):1133-1144.

Zhu, et al., "Effect of particle size on tribological behavior of Ni3Al matrix high temperature self-lubricating composites", Tribology International 2011;44:1800-1809.

* cited by examiner x = 0.1 mm

MONITOR FOR ENVIRONMENTAL PARTICULATE MATTER SIZE, CONCENTRATION, AND COMPLEX INDEX OF REFRACTION

RELATED APPLICATION

This application claims the benefit of U.S. Provisional Patent Application No. 62/913,462, filed Oct. 10, 2019, which is incorporated by reference herein in its entirety.

BACKGROUND OF THE INVENTION

Field of the Invention

The present invention is generally directed toward apparatus and methods for determining particle size, and optionally, the complex index of refraction for the particle. In preferred embodiments, a particle to be analyzed is caused to travel through a modified laser beam. Light from the laser beam that is scattered by the particle is measured by one or more photodetectors disposed at a particular scattering angle relative to the center of the laser beam. The apparatus and methods described herein can be used in sensors configured to monitor air quality in enclosed environments, such as on-board aircraft and within buildings, and/or detect environmental contaminants. Such sensors can determine size and/or both components of the complex index of refraction giving the end user information about the nature of the particle.

Description of the Prior Art

The application of light-scattering to measure particle sizes began more than a century ago. Mie (1908) developed the basic theory for scattering by spheres. Following the Mie theory, early optical particle counters (OPCs) were developed. Gucker, O'Konski, Pickard, and Pitts (1947) built the first modern OPC in 1940s. Since then, there have been gradual improvements in this field. For example, X. Wang et al. (2009) described a light-scattering instrument that combined photometry and single-particle sizing into one optical device, which could detect photometric signal and single-particle scattering signal at the same time, but analyzed only one of the mentioned signals. While previous studies have explored a variety of particle sizing technologies, little is known about determination of the refractive index of PM.

Currently optical particle sizing instruments ranging from expensive to low-cost sensors are used to measure the size and concentration of PM. The key component of any optical detector is the light source. Most light sources, a laser beam for example, have an intensity profile across the beam. For many laser sources, the profile is Gaussian. Thus, the position of the particle in that profile must be known and controlled. To determine the position of the particle in the beam and accurately size the particle, Waez et al. (2018) modified the Gaussian laser beam to a diamond-shaped beam at which the position of the particle was controlled by the beam transit time. Some advanced instruments introduce a sheath flow to keep the particle stream centered as it passes through the beam. The disadvantage of sheath flow is that it can contribute to the dilution of the actual aerosol concentration and it adds cost to the detector. Another tactic is to detect the light at two or more angles and then use the ratio of the scattering for size determination; see, for example, (Hirleman Edwin D, 1980). The ratio eliminates the uncertainty of the incident intensity. The drawback with these particle sizing techniques is that the predicted particle size may vary significantly from reality due to the dependence of light scattering on the refractive index.

Some techniques have been developed to predict particle size and index of refraction. Eidhammer, Montague, and Deshler (2008) developed a twin-angle optical particle counter (OPC) that measured the forward scattering at 40° and 74° to determine particle size and refractive index, respectively. They used the particle number ratio approach at 40° and 74° to determine the complex indices of refraction but their method could give only an average complex index of refraction for a sample containing many particles. This method could not determine the complex index of refraction of each particle. Measurement uncertainties for size here were between 4% and 10% for particles greater than 3 μm in diameter. This uncertainty was measured for a small range of refractive indices, i.e., (1.35-1.60). However, for a larger range of refractive indices, for example, (1.33-3.0), the range of uncertainty would be larger as well. According to Budde, El Masri, Riedel, and Beigl (2013) even certified optical measurements show ±10% uncertainty. Likewise, Hu, Li, Zhang, and Li (2006) developed a dual-scattering-angle optical particle counter that was measuring the light scattered intensities at 60° and 90°, and thus it was called 60°+90° OPC. Their device was measuring the imaginary part of the refractive index by predicting the particle number ratio at two angles. A multi-angle, aerosol spectrometer probe (MASP) was developed by Baumgardner et al. (1996), which collected the scattered light from each particle passing through a focused laser beam over two discrete regions of forward (30-60) and backward (120-150) scattering angles. The MASP used the ratio of the forward and back-scattered light and their sum (total scattering) as a unique function of the particle size and index of refraction. Using this combination, first an average refractive index was determined and then the refractive index was used to convert the total scattering to a diameter. With these devices, there was not enough information on how they had selected these scattering angles. A study by Ebert, Weinbruch, Hoffmann, and Ortner (2004), determined the chemical composition and average complex refractive index of rural and urban aerosol particles by total x-ray fluorescence and high resolution scanning electron microscopy. First, they analyzed the chemical composition of each material and classified them into different particle groups of known indices of refraction. Then the average complex index of refraction was determined by summing the product of the refractive index and volume of each particle group and dividing them by the total volume, i.e., sum of the volume of each particle group. This method could not determine the complex index of refraction of particles on a real-time basis.

A need exists for a device that considers the functionality of the refractive index on light scattering and particle sizing and simultaneously measures the particle size and both the real and imaginary parts of the index of refraction.

SUMMARY OF THE INVENTION

According to one embodiment of the present invention there is provided apparatus for determining one or more characteristics of a solid or liquid particle suspended within a fluid. The apparatus comprises a laser configured to emit a laser beam, a collimating lens through which the laser beam is passed, and an aperture configured to modify a Gaussian profile of the laser beam. The apparatus also comprises one or more photodetectors that are configured to detect light from the laser that is scattered by a particle passing through the laser beam and to generate one or more signals corresponding to information about the particle. The apparatus further includes a processor that is operable to receive and record one or more signals from the one or more photodetectors and to process the information to determine the one or more characteristics of the particle.

According to another embodiment of the present invention, apparatus is provided for determining one or more characteristics of a solid or liquid particle suspended within a gas. This embodiment comprises a laser configured to emit a laser beam, a collimating lens through which the laser beam is passed, and a diamond-shaped aperture through which the laser beam passing through the collimating lens is directed and which is configured to form a modified laser beam having a diamond-shaped profile. The apparatus also comprises a focusing lens through which the modified laser beam is passed, and at least two photodetectors configured to detect light from the laser that is scattered by a particle passing through the laser beam and to generate one or more signals corresponding to information about the particle. At least one of the photodetectors is positioned at a scattering angle of 37°±5° from the center of the laser beam, and at least one other of the photodetectors is positioned at a scattering angle of 115°±5° from the center of the laser beam. The apparatus further includes a processor operable to receive and record one or more signals from the at least two photodetectors and to process the information to determine at least one of the size and/or complex index of refraction of the particle.

According to still another embodiment of the present invention, a method of determining one or more characteristics of a solid or liquid particle suspended within a fluid is provided. The method comprises passing a laser beam through an aperture that is configured to modify a Gaussian profile of the laser beam and form a modified laser beam. The particle is caused to pass through the modified laser beam, the particle causing light from the modified laser beam to scatter. The intensity of the scattered light and the time of flight of the particle through the modified laser beam are measured using one or more photodetectors. The one or more photodetectors output one or more signals corresponding to information about the particle. The one or more signals from the one or more photodetectors are then processed to determine the one or more characteristics of the particle.

According to yet another embodiment of the present invention a method of monitoring an environment for the presence of particulate contaminants is provided. The method comprises directing a sample of a fluid comprising one or more particles into a particle characterization apparatus. The apparatus comprises a laser configured to emit a laser beam, a collimating lens through which the laser beam is passed, an aperture configured to modify a Gaussian profile of the laser beam, and one or more photodetectors configured to detect light from the laser that is scattered by the one or more particles when passing through the laser beam. The laser beam is passed through an aperture to form a modified laser beam. The one or more particles then are caused to pass through the modified laser beam, the one or more particles causing light from the modified laser beam to scatter. The intensity of the scattered light and the time of flight of the one or more particles through the modified laser beam are measured using the one or more photodetectors. The one or more photodetectors outputs one or more signals corresponding to information about the particle. The one or more signals from the one or more photodetectors are processed to determine a characteristic of the one or more particles that is associated with the composition thereof.

DETAILED DESCRIPTION OF THE PREFERRED EMBODIMENT

Apparatus has been developed that can detect the presence of particles, solid or liquid, suspended within a fluid (i.e. a gaseous or liquid medium), and determine their size and complex index of refraction. The apparatus is particular suited for detecting and measuring particles having a size, in its greatest dimension, of larger than one micron. Supramicron particles, often referred to as coarse-mode particles, occur as dusts—such as wind-blown mineral dusts that represent the largest mass fraction of aerosols in the Earth's atmosphere, grain and coal dusts, bio-aerosols, indoor cooking aerosols, large combustion particles from wildfires, and volcanic ash. Determination of complex index of refraction provides a good indication of the type and material of particulates.

Index of refraction is defined as the ratio of the speed of light in a vacuum to the speed of light in a particular material. Once aerosol particles are illuminated by a beam of light, they scatter and absorb some of that light, thereby diminishing the intensity of the beam. While all aerosol and colloidal particles scatter light, only those made of absorbing material will absorb light. Therefore, the index of refraction will have two components, i.e., m=n+iκ. The real part, n, is related to the scattering, while the imaginary part, κ, is related to absorption. A non-absorbing material, e.g., glass, will only have the real part; however, an absorbing material, e.g., mineral dust, will have both the real and the imaginary parts. Given their prevalence, it is important to be able to detect and accurately measure the size and index of refraction of the particles because particulate matter (PM) has adverse effects on human health, and the harm to human beings from PM is related to its size as well as to its type and material. PM causes various respiratory and cardiovascular diseases when there is long term exposure into it. Some of these harmful PM types include finely divided solids or liquids such as dust, fly ash, soot, smoke, aerosols, fumes, mists, and condensing vapors that can be suspended in the air for extended periods of time.

Figure 1:
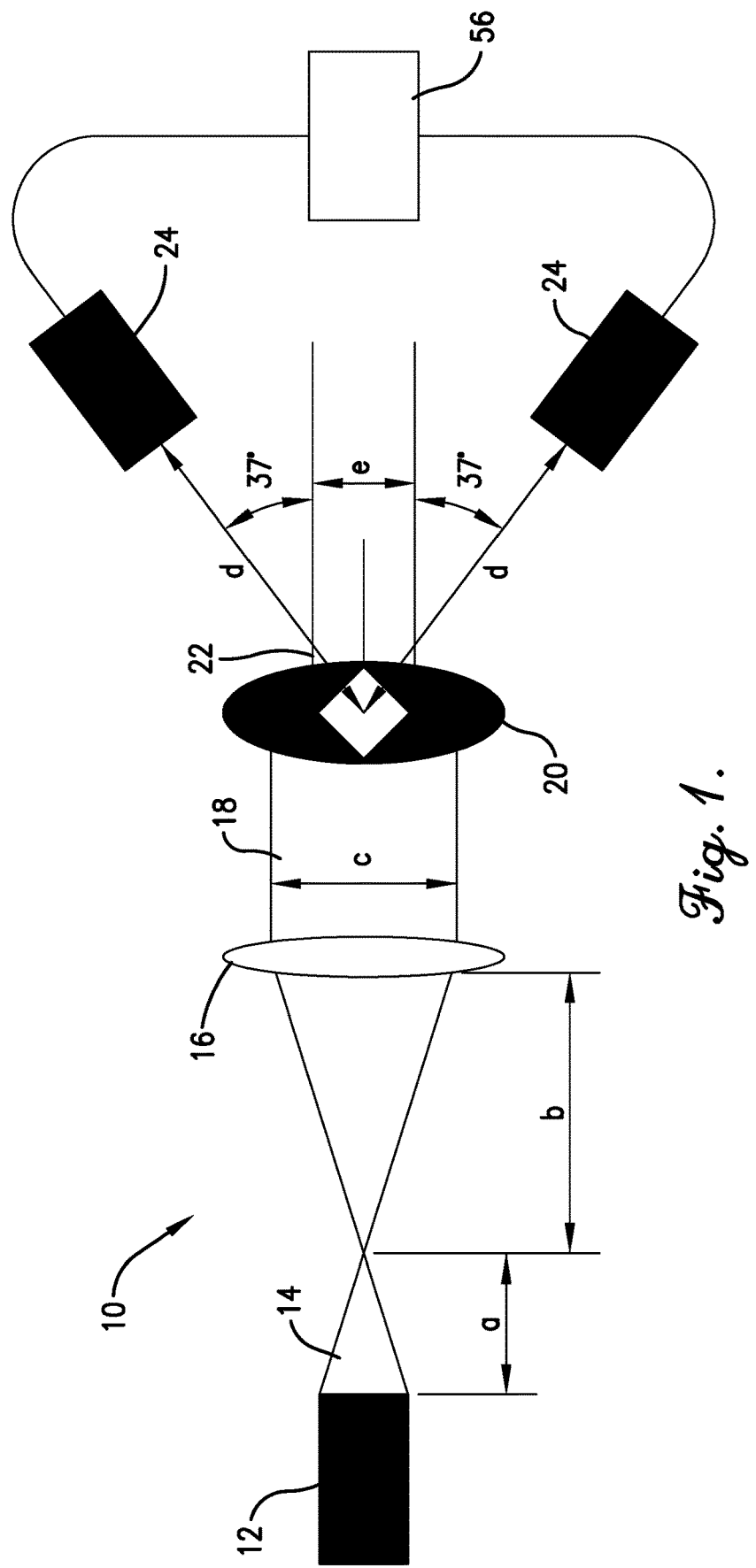
FIG. 1 is a schematic illustration of one embodiment of an apparatus for determining one or more characteristics of a solid or liquid particle suspended within a gas.

One embodiment of apparatus 10 according to the present invention is depicted schematically in FIG. 1. Apparatus 10 comprises a laser 12 that is operable to emit a laser beam 14 therefrom. Laser 12 can be any suitable laser known in the art such as a gas laser, dye laser, metal-vapor laser, solid state laser (e.g., a diode-pumped solid-state laser (DPSSL)), or a semiconductor laser. The beam 14 is directed through a collimating lens 16 that aligns the light in a parallel fashion, which ensures the light has minimal spread as it propagates. The collimated beam 18 is passed through an aperture 20 to form a beam 22 having a modified Gaussian profile. In preferred embodiments, the aperture is diamond-shaped which provides a diamond-shaped profile to beam 22. At least one, and preferably two, photodetectors 24 are positioned to detect light that is scattered from the center of the laser beam 22. Photodetectors 24 can be of any sensor capable of detecting light or other electromagnetic radiation. Exemplary photodetectors include photoelectric detectors (e.g., photomultiplier tubes, microchannel plate detectors, and phototubes), semiconductor detectors (e.g., active-pixel sensors, charge-coupled devices (CCD), photoresistors, photodiodes, phototransistors, quantum dot photoconductors, and silicon drift detectors (SDDs)), photovoltaic cells, photochemical detectors, and polarization detectors. However, photodiodes particularly preferred photodetectors for use with the present invention. As illustrated, each photodetector 24 is positioned to detect light scattered at 37° (±5°) from the center of the laser beam 22.

FIG. 1 contains several variables denoting the dimensions of various features associated with apparatus 10. Table 1 provides dimensions, in mm, of an exemplary apparatus 10.

TABLE 1

| Reference letter | Dimension (mm) |
| --- | --- |
| a (focal length) | 150 |
| b (focal point to collimating lens) | 290 |
| c (beam diameter) | 7.5 |
| d (photodiode to center of modified beam) | 18 |
| e (diagonal of modified beam) | 7.07 |

Figure 2:
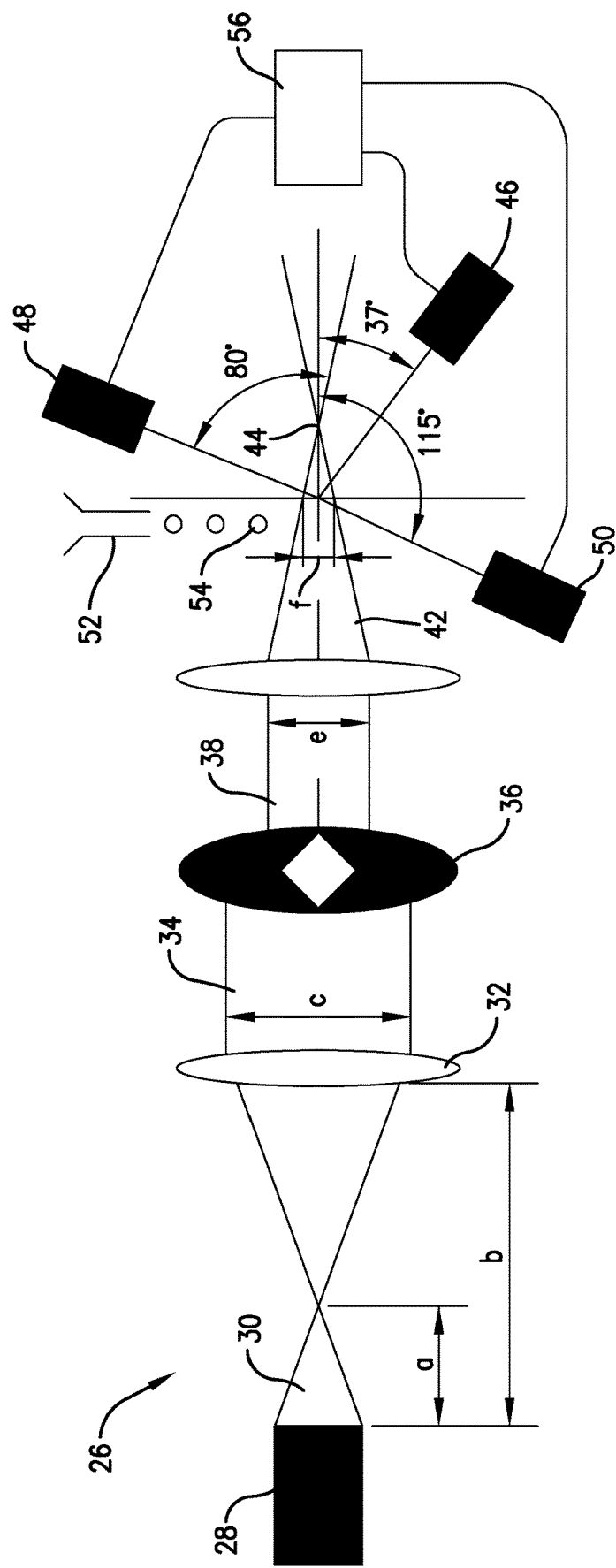
FIG. 2 is a schematic illustration of another embodiment of an apparatus for determining one or more characteristics of a solid or liquid particle suspended within a gas.

Another embodiment of an apparatus 26 according to the present invention is depicted schematically in FIG. 2. Apparatus 26 is similar in several respects to apparatus 10 of FIG. 1, with the addition of a few elements. Apparatus 26 comprises a laser 28 that is operable to emit a laser beam 30 therefrom. Laser 28 can be any suitable laser known in the art such as those discussed previously. The beam 30 is directed through a collimating lens 32 that aligns the light in a parallel fashion, which ensures the light has minimal spread as it propagates. The collimated beam 34 is passed through an aperture 36 to form a beam 38 having a modified Gaussian profile, such as a diamond-shaped profile as discussed above. Beam 38 is then passed through a focusing lens 40 to form a beam 42 that converges to a focal point 44. In this embodiment, apparatus 26 comprises at least two, and preferably three photodetectors 46, 48, 50, which again are preferably photodiodes, and are positioned to detect light scattered by a particle passing through the center of the focused laser beam 42 as some distance prior to the focal point 44. The photodetectors 46, 48, 50 are positioned at 37° (±5°), 80° (±5°), and 115° (±5°), respectively, from the center of the laser beam 42.

In alternative embodiments, if apparatus 26 comprises only two photodetectors 46, 50, one of the photodetectors 46 is positioned at a scattering angle of 37°±5° from the center of the laser beam 42, and one other photodetector 50 is positioned at a scattering angle of 115°±5° from the center of the laser beam 42.

FIG. 2 contains several variables denoting the dimensions of various features associated with apparatus 26. Table 2 provides dimensions, in mm, of an exemplary apparatus 26.

TABLE 2

| Reference letter | Dimension (mm) |
| --- | --- |
| a (focal length) | 150 |
| b (focal point to collimating lens) | 290 |
| c (beam diameter) | 7.5 |
| e (diagonal of modified beam) | 7.07 |
| f (width of beam at focus point of photodetectors) | 3 |

It is noted that for apparatus 10 and 26, the various photodetectors may be positioned on the same side or on opposite sides of the respective laser beam. For example, in FIG. 1, photodetectors 24 can be located on the same side of beam 22, or they can be located on opposite side of the beam. In the case of apparatus 26, all three photodetectors 46, 48, 50 can be located on the same side of beam 42, or two photodetectors 46, 50 can be placed on the same side of beam 42 and one photodetector 48 can be located on the opposite side of beam 42 from photodetectors 46, 50.

In one or more embodiments, apparatus 10, 26 may comprise a component 52 that is configured to direct the flight of the particle 54 through the laser beam 42. In one or more embodiments, the particles 54 are spherical. However, it is also within the scope of the present invention for non-spherical particles to be measured. Component 52 is schematically depicted as a converging conduit, but any suitable structure, that is preferably configured to direct a single particle at a time through the laser beam 42, may be employed. Exemplary components 52 include microfluidic devices, filtration devices, and fluid injection devices.

The apparatus may also comprise a processor 56 operable to record the signals from the one or more photodetectors and process the data generated from the one or more photodetectors to determine the size, and optionally, the complex index of refraction of the particle. The complex index of refraction, n, of a material is a dimensionless number than describes how fast light travels through a material. The index of refraction determines how much the path of light is bent, or refracted, when entering a material. The complex index of refraction is made up of a real part that accounts for refraction, and an imaginary part that addresses the attenuation. Based upon the complex index of refraction, the processor can be configured to identify the composition of the particle 54 passing through laser beam 42.

According to another embodiment of the present invention, apparatus 10 and/or 26 can be used to determine determining one or more characteristics of a solid or liquid particle suspended within a fluid, (e.g., a gas or liquid). Using apparatus 26, for example, the laser beam 34 is passed through aperture 36 which is configured to modify the Gaussian profile of the laser beam 34. A particle 54 is then caused to pass through the modified laser beam 42, which causes light from the laser beam 42 to scatter. The method further comprises measuring the intensity of the scattered light and the time of flight of the particle through the laser beam using one or more photodetectors 46, 48, 50.

Certain embodiments of the present invention pertain to apparatus and methods used in measuring particulate size independent of the real part of the refractive index. In these embodiments, a diamond-shaped laser beam 38 is formed, and particulates 54 are passed through the beam. Light from the beam that is scattered by the particles is detected by the one or more photodetectors 46, 48, 50. At least one of the photodetectors 46 is positioned at a 37±5° angle from the center of the beam 42.

In preferred embodiments, the light scattered by the particles 54 is measured by photodetectors 46, 48, 50 positioned at angles of 37±5°, 80±5°, and 115±5°. Through the addition of the two additional angles, embodiments of the present invention are able to determine not only the particle size but both the real and imaginary parts of the refractive index for the particle. Furthermore, it was discovered that the combination of a diamond-shaped laser beam and measuring the intensity of light scattering at the three angles identified above led to a more accurate determination of size.

According to still another embodiment of the present invention apparatus 10 and/or 26 can be used to monitor an environment for the presence of particulate contaminants. In this method, a sample of a gas comprising one or more particles 54 suspended therein is directed into a particulate sensor device 26. Generally, however, such apparatus comprises a laser 28 configured to emit a laser beam 30, a collimating lens 32 through which the laser beam is passed, an aperture 36 configured to modify the Gaussian profile of the laser beam 34, and one or more photodetectors 46, 48, 50 configured to detect light from the laser that is scattered by a particle 54 passing through the laser beam 42. The one or more particles 54 contained in the gas sample are passed through the laser beam 42, and the intensity of the scattered light and the time of flight of the one or more particles 54 through the laser beam 42 are measured using the one or more photodetectors 46, 48, 50. The information received from the one or more photodetectors is analyzed by processor 56 to determine at least a particle size for the one or more particles, and preferably also the complex index of refraction for the one or more particles. The data generated by the processor 56 can then be used to identify the composition of the one or more particles, or at least make a determination that the particles do not belong to a certain class of materials.

For example, the present invention is particularly suited for monitoring bleed air that is brought into aircraft cabins. Such bleed air can be contaminated by oil due to oil seal leaks in the compressor. Fine oil particulates dispersed within the bleed air can be a health hazard for the aircraft passengers and crew. However, the bleed air may also comprise harmless fine droplets of water (i.e., fog) produced by the aircraft's air conditioning system. Devices according to the present invention can be employed to positively identify the composition of the droplets suspended within the bleed air. Alternatively, the devices can be used to identify whether or not the droplets are a particular type of materials, for example water droplets. Thus, if the droplets can be identified as water droplets, the device can indicate that the bleed air is not contaminated. However, if the device determines that the droplets are not water droplets (without positively identifying the composition of the droplets), the aircraft operator can be alerted, and the bleed air system inspected for oil leaks or other sources of contaminants.

Other applications for devices constructed according to the present invention include monitoring of air quality within buildings, detection and identification of particulate matter within the exhaust of internal combustion engines, sorting and identifying the type and material of polydisperse solid particles to get highly monodisperse particles of known material out of them and reducing their production costs, and sizing fuel particles that can be used in advanced nuclear reactors. Devices according to one or more embodiments of the present invention can also be used to monitor suspended particles in liquids, for example in water quality monitoring applications.

In one or more embodiments, the present invention can address the "inverse problem". The inverse problem is to determine particle properties, such as size, shape, and both parts of the complex refractive index, from the angular pattern of the scattered light. This is contrast with thee "forward problem" which is, given a particle size, shape and both parts of the refractive index, to calculate the scattered intensity and angular scattering pattern. Solutions to the forward problem include Rayleigh scattering (simple), the Mie equations (which are complex) for spheres, and modern DDA and T-matrix methods (which can be very complex) for other shapes. The forward problem is mathematically well-posed, whereas the inverse problem is ill-posed, i.e. solutions are ambiguous. Thus, embodiments of the present invention employ strategies beyond the mathematical to solve the inverse problem.

In one or more embodiments, a strategy for the inverse problem has been developed that works well for spherical particles in the size range ca. 5 to 1000 microns. To gain a qualitative understanding of this strategy, consider the fact that spherical particles have only three parameters that describe their light scattering, viz. size (radius) and the real and imaginary parts of the refractive index ($m=n+i\kappa$). Thus, one might expect that three measurements of the scattering at three different angles, would lead to three equations for the three unknowns, and hence the unknowns are found. Alas, in reality it is not that easy because the governing Mie equations are very complex and result in the ambiguous, ill-posed situation mentioned above. However, it has been discovered that the differential scattering cross-section is independent of the real and imaginary parts of the refractive index, n and κ, at angles near 37±5° and 115±5°, respectively. These "stationary angles" subdue the ill-posed nature of the inversion. Then by combining the modified beam profile with detection of scattered light near 37±5°, 115±5°, and 80±5°, a device can be constructed that measures the particle size, real and imaginary parts of the index of refraction simultaneously of single spherical particles as they passed through the beam.

Measurement of size and refractive index, $m=n+i\kappa$, is a significant step in describing the physical properties of a particle. Different materials have different refractive indices hence knowledge of the refractive index can indicate what the particle could be composed of, but the identification is far from unique. However, if the measurement is made at two or three or many wavelengths, the possibility for a unique determination of the composition of the particle becomes very high. This is because different materials have different dispersion functionalities of their refractive index versus wavelength. With this approach, an optical detector that can measure size and composition of particles based on simple elastic light scattering is feasible.

Thus, based on these principles, simple automatous sensor devices can be used to monitor air and water quality and environmental contaminates in a wide variety of situations including both indoor, e.g. aircraft, buildings, industrial plants, etc., and outdoor, e.g. construction, agricultural, waste management, battlefield sites. The sensor restricts the air or water (or gas or liquid) flow so that only one particle at a time passes through the scattering volume.

In one or more embodiments, the particles being measured are spherical. However non-spherical particles can be measured as well. The approach of measuring non-spherical particles is that the light scattering phase function, i.e. the scattered intensity as a function of scattering angle, is much better illustrated and understood by plotting, not as a linear function of the scattering angle $\theta$, but as a logarithmic function of the scattering wave vector magnitude q, where $$q=2k \sin(\theta/2) \quad (1)$$

Here $k=2\pi/\lambda$ with $\lambda$ the wavelength. We call plotting scattered intensity, I(q) vs q, on a log-log plot "Q-space analysis".

One advantage of this approach is that I(q) in the limit of the refractive index approaching 1.0, is the structure factor of the particle shape. Fourier transform the particle shape into q-space and square it, and one gets the structure factor. This is also the diffraction pattern of the particle. This approach is applicable to any shape. From this foundation scattering unfolds as the electromagnetic aspect of the light is "turned on" by increasing the refractive index. This unfolding yields systematic patterns governed by universal parameters that allow for a new, quantitative way of describing light scattering by spheres and other shapes.

The universal governing parameters that guide scattering away from the diffraction limit are: 1) the internal coupling parameter $$\rho'=2kR\sqrt{F(m)} \quad (2)$$

where $k=2\pi/\lambda$, $\lambda$ is the light wavelength, R is the particle radius, and $F(m)=|(m^2-1)/(m^2+2)|^2$, and 2) the relative optical penetration parameter $$\kappa kR=R/\delta \quad (3)$$

where $\delta$ is the optical penetration depth.

These parameters govern the progression away from the diffraction limit for both spherical and non-spherical particles.

This approach involves the discovery of "stationary angles" at which either the real or imaginary part of the refractive index causes no functionality in the scattering. This provides a straightforward approach in addressing the long-standing inverse scattering problem, which is to determine size and both parts of the refractive index of a particle that scatters light. In addition, embodiments of the present invention can use a very wide range of scattering angles. At very small scattering angles, e.g. 0.3°, the size can be determined without the need for the refractive index through a Guinier analysis. At very large scattering angles near 180°, the scattering is very sensitive to shape and possible aggregate structure.

The "Q-space analysis" uses the scattering wave vector, q as the independent variable for the scattered intensity. The advantage of q is that it is the Fourier variable of the particle's structure factor. The scattering is plotted double logarithmically which allows quantitative power laws to emerge which are fundamental to the quantitative description of the scatterer and Guinier crossovers between power laws that indicate length scales of the scatterer. In addition, two new parameters that give a quasi-universal parameterization of the scattering have been discovered.

Optimum Scattering Angles

When a particle passes through an optical beam, it scatters light over a $4\pi$ steradian solid angle. The amount of light scattered by the particle is characterized by the scattering cross-section. The scattering cross-section can be a function of many variables including scattering angle, excitation wavelength, particle size, and refractive index. In practical light-scattering systems, only a portion of the scattered light is gathered by a photodiode, which rests at a given angle. Such measurements are related to the differential-scattering cross-section. In one embodiment of the present invention, the photodiodes positioned at 37°, 80°, and/or 115° collect light over a 10° scattering-angle range.

Considering the complex index of refraction of particles, actual differential-scattering cross-sections averaged over a 10° scattering-angle were plotted for three different particle diameters and four different complex refractive indices using the Mie online program. It is important to acknowledge that effects of the imaginary part of the refractive index, $\kappa$, become significant only if its product to the size parameter, $\pi d/\lambda$, also defined as $\kappa kR$, is greater than or equal to 0.1, i.e., $\kappa kR>0.1$, where $\lambda$ is the wavelength, R is the radius of the particle, and k is the wave number. A strong functional relationship was observed with the complex refractive index, and the differential-scattering cross-section, $dC/d\Omega$, is relatively independent of $\kappa$ at a scattering angle of 115±5°. However, it depends on both the real and the imaginary components at other angles, but its dependence is more consistent and distinguishable at 80±5°.

Using these plots Eqs. (10), (11) and (12) were obtained to relate the functionality of $dC/d\Omega$ to particle diameter d, n, and $\kappa$ at 37±5°, 80±5° and 115±5° scattering angles, respectively. These equations were fitted for particle sizes of 5 μm and above with an uncertainty of ±10%; however, they still can be used for particle sizes down to 1 μm with a larger uncertainty of ±35%.

Theoretical Analysis

Many parameters play a role in predicting particle size. These parameters can be related to the laser, cut-beam geometry, photodiode, photodiode amplifier as well as the complex index of refraction of particles. In this section, all parameters are related to each other in order to present three equations for predicting particle diameter d, n, and $\kappa$.

For a Gaussian beam, $$I(r)=I_0 e^{-(2r^2/w^2)} \quad (1)$$

where I(r) is the intensity as a function of the beam radius, $I_0$ is the peak intensity at the center of the beam, r is the radial distance from the beam center, and w is the beam waist.

The radial distance in rectangular coordinates is $$r=\sqrt{x^2+x^2} \quad (2)$$

Total power in the beam is the integral of Eq. (1).

$$P_{Tot}=\int_0^\infty \int_0^{2\pi} I(r)r\,dr\,d\theta \quad (3)$$

Combining Eqs. (1) and (3) and integrating, one finds the total power in the beam.

$$P_{Tot}=I_0\int_0^\infty \int_0^{2\pi} e^{-(2r^2/w^2)}r\,dr\,d\theta=\pi/2 I_0 w^2 \quad (4)$$

$P_{Tot}$ is generally a known parameter. Then Eq. (4) can be solved for $I_0$.

To obtain the scattered power on the photodiode, Eq. (1) can be multiplied by the differential scattering cross-section of particle and integrated with a solid angle.

$$P_{scat}=\int_0^{\Delta\Omega} I(r)\,dC/d\Omega\,d\Omega \quad (5)$$

In Eq. (5), $\Delta\Omega$ is the solid angle the photodiode makes with the particle position in the beam. Assuming $dC/d\Omega$ is constant in the small (±5°) collection-angle range, Eq. (5) can be estimated as $$P_{scat} = I_0 e^{-(2r^2/w^2)} dC/d\Omega \Delta\Omega \quad (6)$$

The photodiode gives an output voltage $V_i$, which can be obtained by $$V_i = P_{scat} * R(\lambda) * K \quad (7)$$

In the above equation, $R(\lambda)$ is the photodiode responsivity and K is the conversion factor of the photodiode amplifier.

Figure 3:
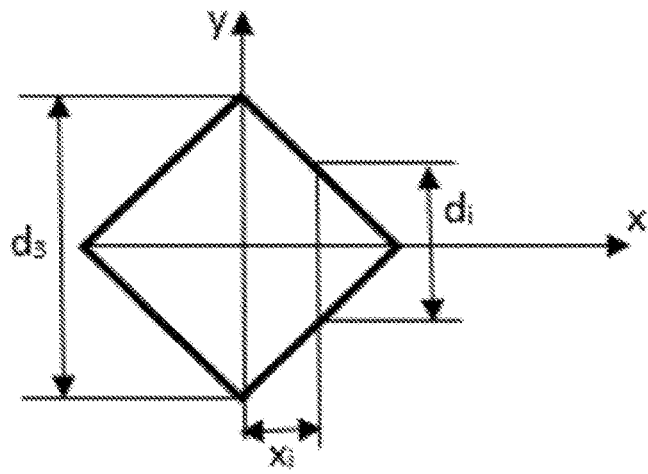
FIG. 3 schematically depicts various parameters of a diamond-shaped beam profile that is generated by passing a laser beam through a diamond-shaped aperture.

Since a diamond-shaped beam was considered, the new beam parameters were taken into account. The parameters in diamond-shaped beam as shown in FIG. 3, can be related as Eq. (8).

$$d_i = v * t_i = d_3 - 2x_i \quad (8)$$

In Eq. (8), v is the average velocity of the particle and $t_i$ is the time of flight of a particle passing through any $x_i$ position in the beam. It is assumed that the particles are delivered to the scattering volume with the same velocity.

Since peak-scattered intensity is desired for a given velocity and time of flight, and the peak-scattered intensity can be on the x axis for the particles being dropped vertically and passing through any $x_i$ position, we assume the y component of r in Eq. (2) to be zero. Thus, only the x component of r can play a role in that equation. Solving Eq. (8) for $x_i$ and substituting it for r into Eq. (6), Eq. (9) is obtained.

$$I_0 e^{-(2x_i^2/w^2)} dC/d\Omega \Omega_i = I_0 e^{(-(d_3-vt_i)^2/2w^2)} dC/d\Omega \Omega_i \quad (9)$$

Actual differential scattering cross-sections for each particle diameter and four different refractive indices were obtained using an online program (Laven, 2010). Using actual values of $dC/d\Omega$, equations were found for the differential scattering cross-section vs. particle diameter for the three scattering angles mentioned above.

$$dC/d\Omega(37°) = \left[\frac{0.168}{30*(\kappa kR)^2 + 1} + 0.012\right] d^2 \quad (10)$$

$$dC/d\Omega(80°) = \\ [-0.0056(n - 0.33)^2 + 0.031(n - 0.33) - 0.0233] d^2 (\kappa kR)^{-0.38} \quad (11)$$

$$dC/d\Omega(115°) = 0.0127(n-1)^{1.4} d^{1.9} \quad (12)$$

Combining Eqs. (4), (7), (9), and (10), we get $$V_i(37°) = \frac{2P_{Tot}}{\pi w^2} e^{(-(d_3-vt_i)^2/2w^2)} \left[\frac{0.168}{30*(\kappa kR)^2 + 1} + 0.012\right] d^2 \Omega_i R(\lambda) K \quad (13)$$

Combining Eqs. (4), (7), (9), and (11), we get $$V_i(80°) = \frac{2P_{Tot}}{\pi w^2} \\ e^{(-(d_3-vt_i)^2/2w^2)} [-0.0056(n-0.33)^2 + 0.031(n-0.33) - 0.0233] \\ d^2 (\kappa kR)^{-0.38} \Omega_i R(\lambda) K \quad (14)$$

Combining Eqs. (4), (7), (9), and (12), one gets $$V_i(115°) = \frac{2P_{Tot}}{\pi w^2} e^{(-(d_3-vt_i)^2/2w^2)} [0.0127(n-1)^{1.4}] d^{1.9} \Omega_i R(\lambda) K \quad (15)$$

Eqs. (13), (14), and (15) can be solved simultaneously and iteratively to determine diameter d of the particle, $\kappa kR$, and the real part, n of the refractive index, n. Once $\kappa kR$, and d have been determined, we can simply predict $\kappa$. To iteratively solve the non-linear system of equations, the well-known Newton's method of iteration can be used.

EXAMPLES

Figure 4A:
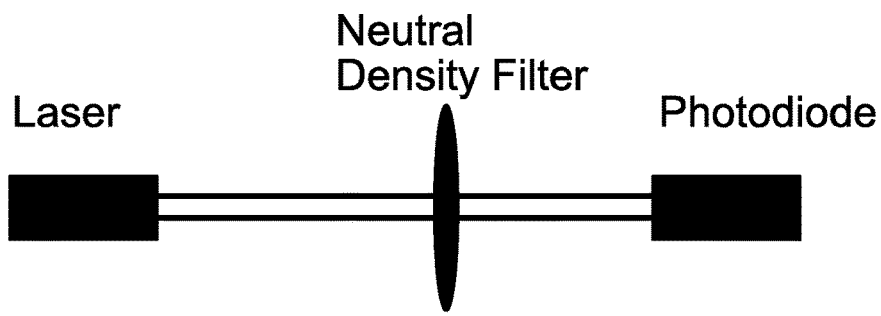
FIGS. 4a and 4b schematically depict a light-extinction mechanism for measuring, with and without solution.
Figure 4B:
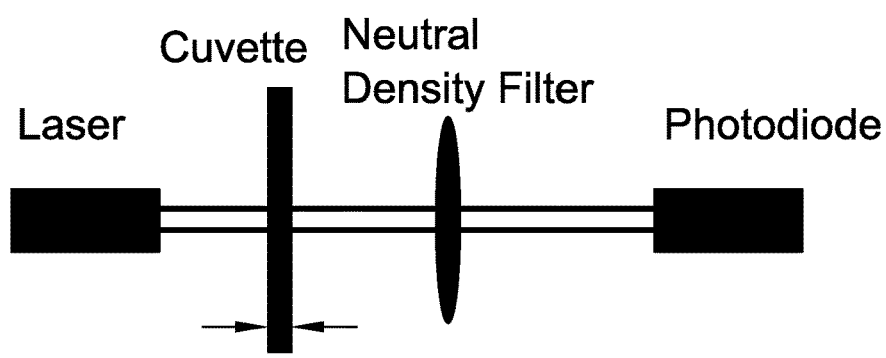

In order to validate the developed mathematical models, experiments were conducted. In these experiments, scattered-light intensities of the droplets of nigrosine solutions (nigrosine powder in water or toluene) at different dilution ratios were measured for the three different scattering angles. Then the peak scattered intensities with the total time of flights were used to iteratively solve for, d, n, and $\kappa kR$. Initially, $\kappa$ was experimentally measured for different concentrations of nigrosine-to-water and nigrosine-to-toluene solutions in order to have some known values of $\kappa$ to compare to the predicted values iteratively obtained by our mathematical models. The real refractive index, n, is 1.33 for water and 1.497 for toluene. Since a small amount of nigrosine was mixed with water and toluene, and the mole fraction of nigrosine was very small compared to the mole fractions of water and toluene, no changes were noticed in the real part, n, of each solution and thus the values of n for water and toluene remained the same. Monodisperse droplets of these solutions were generated by a nanofil syringe with a needle that were measured under a microscope before they were released from the needle tip. Once actual values of n, $\kappa$, and d had been determined, they were then compared to the predicted values iteratively obtained by the mathematical models. The experimental procedures are explained in detail as follows. For each solution, $\kappa$ was measured using a light-extinction mechanism. The schematic diagram of the setup is shown in FIGS. 4a and b. The schematic of the setup for measuring $\kappa$ is shown in FIG. 4a without solution, and FIG. 4b with solution.

The experimental setup has a 532-nm wavelength laser, a neutral density filter to attenuate the light in order to protect the photodiode from saturation, and a photodiode to record light intensity. The photodiode from FIG. 4a recorded the initial intensity, $I_O$, and the photodiode from FIG. 4b recorded the light intensity, $I_1$, after a 0.1-mm cuvette with the solution inside was placed along the beam. Then the parameters were related using Lambert Beer's law in order to find $\kappa$.

$$I_1 = I_0 e^{\frac{-x}{x_0}} \quad (16)$$

$$\kappa = \frac{\lambda}{2\pi x_0} \quad (17)$$

Figure 5B:
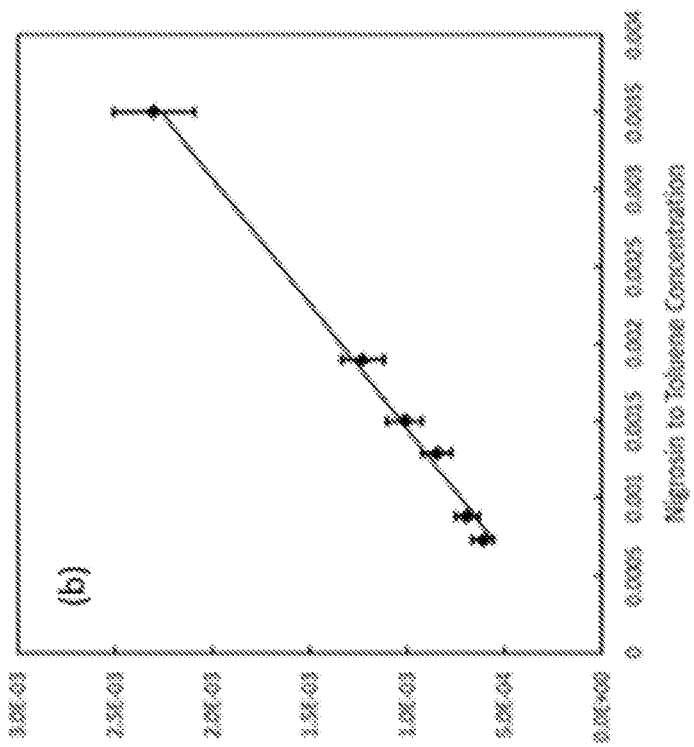
FIGS. 5a and 5b show the values of κ for different concentrations of nigrosine solution-to-water and nigrosine powder-to-toluene, respectively.
Figure 5A:
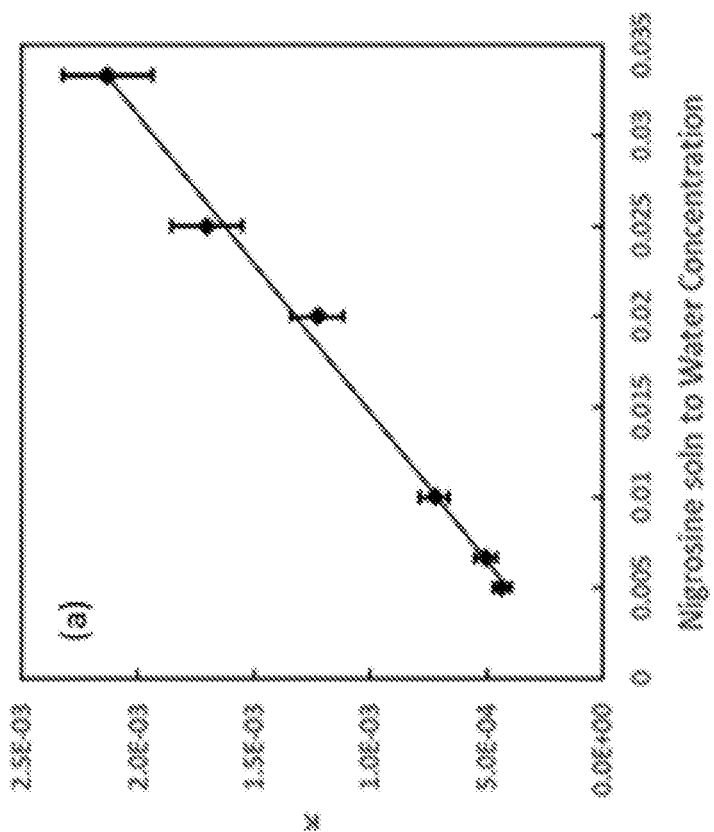

Eq. (16) was solved for $x_0$ and then Eq. (17) was solved for $\kappa$. FIGS. 5a and 5b show the values of $\kappa$ for different concentrations of nigrosine solution-to-water and nigrosine powder-to-toluene, respectively. The ±9% uncertainty indicates the resolution error due to photodiode readings for $I_0$ and $I_1$.

It can be seen that $\kappa$ increases with concentration. This means the higher the nigrosine concentration, the darker the solution and hence the higher the absorption. In other words, as the nigrosine concentration goes to zero, i.e., pure water and pure toluene, κ approaches to zero as well, which indicates the value of κ is very small or close to zero for water and toluene.

In order to detect the scattered light by droplets at three scattering angles, the experimental apparatus of FIG. 2 was used having a focusing lens and photodiodes at 37°, 80°, and 115° scattering angles. Apparatus dimensions are provided in Table 2.

The experimental setup used a Laserglow BDG005XXX, 5-mW, 532-nm wavelength laser; a collimating lens; an aperture to make a diamond-shaped beam profile with dimensions of 5 mm×5 mm; and three Thorlabs SM05PD1A photodiodes with a responsivity of R (532 nm)=0.32 A/W positioned at 37°, 80°, and 115° scattering angles. Three Thorlabs PDA200C photodiode amplifiers with a conversion coefficient of 1×10$^7$ V/A were used to display the scattered-light signal detected by the photodiodes. A National Instruments (NI) SCXI-1000 data acquisition system was connected to the photodiode amplifiers and LabVIEW program to record the data. A nanofil syringe with a 36G beveled-shape needle (35-μm inner diameter and 120-μm outer diameter) was used to drop a droplet of nigrosine-water solution or nigrosine-toluene solution on a 3-mm focused beam.

Figure 6A:
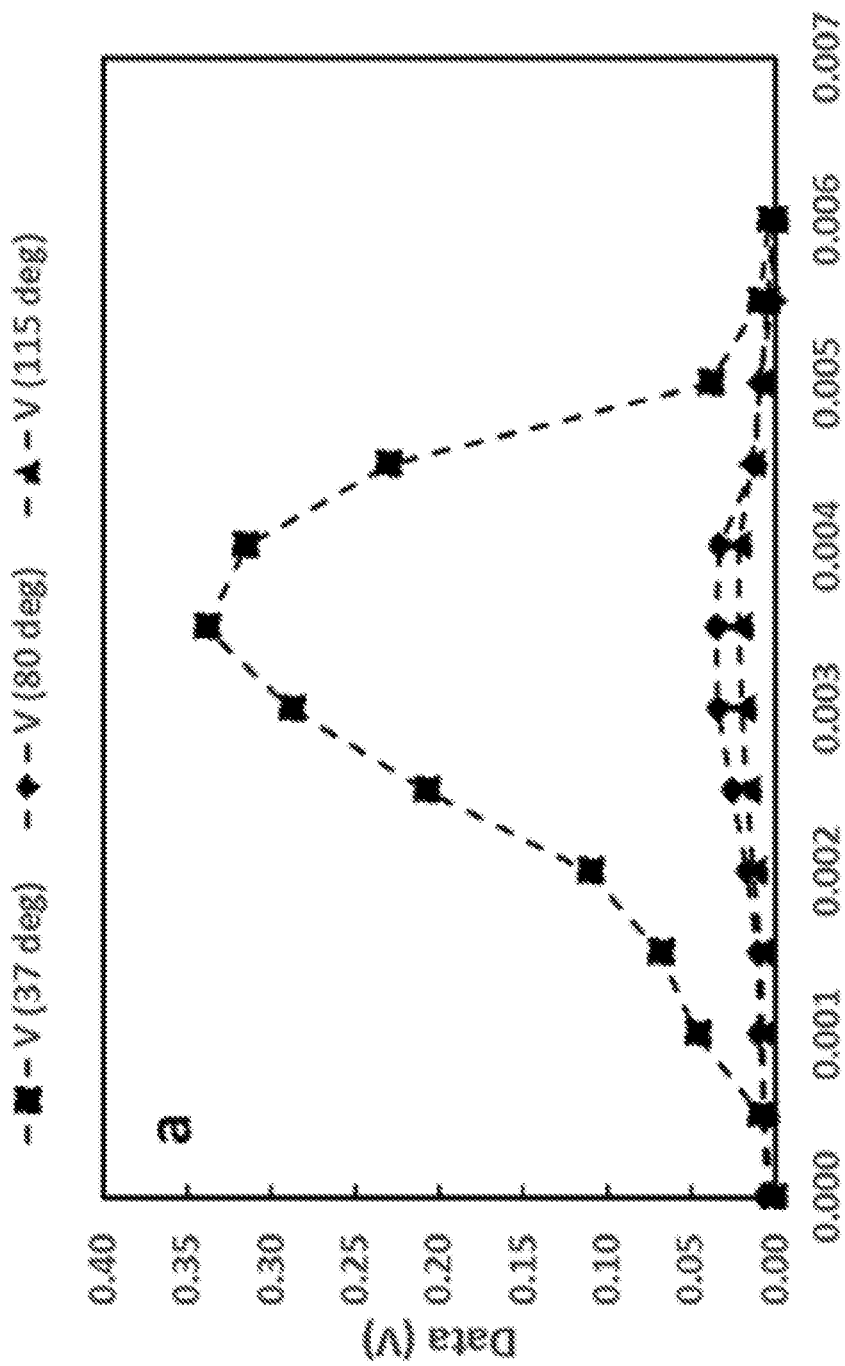
FIGS. 6a and 6b are charts of photodiode output versus time of flight for a 300 μm droplet of nigrosine/water solution at a ratio of 1:150.
Figure 6B:
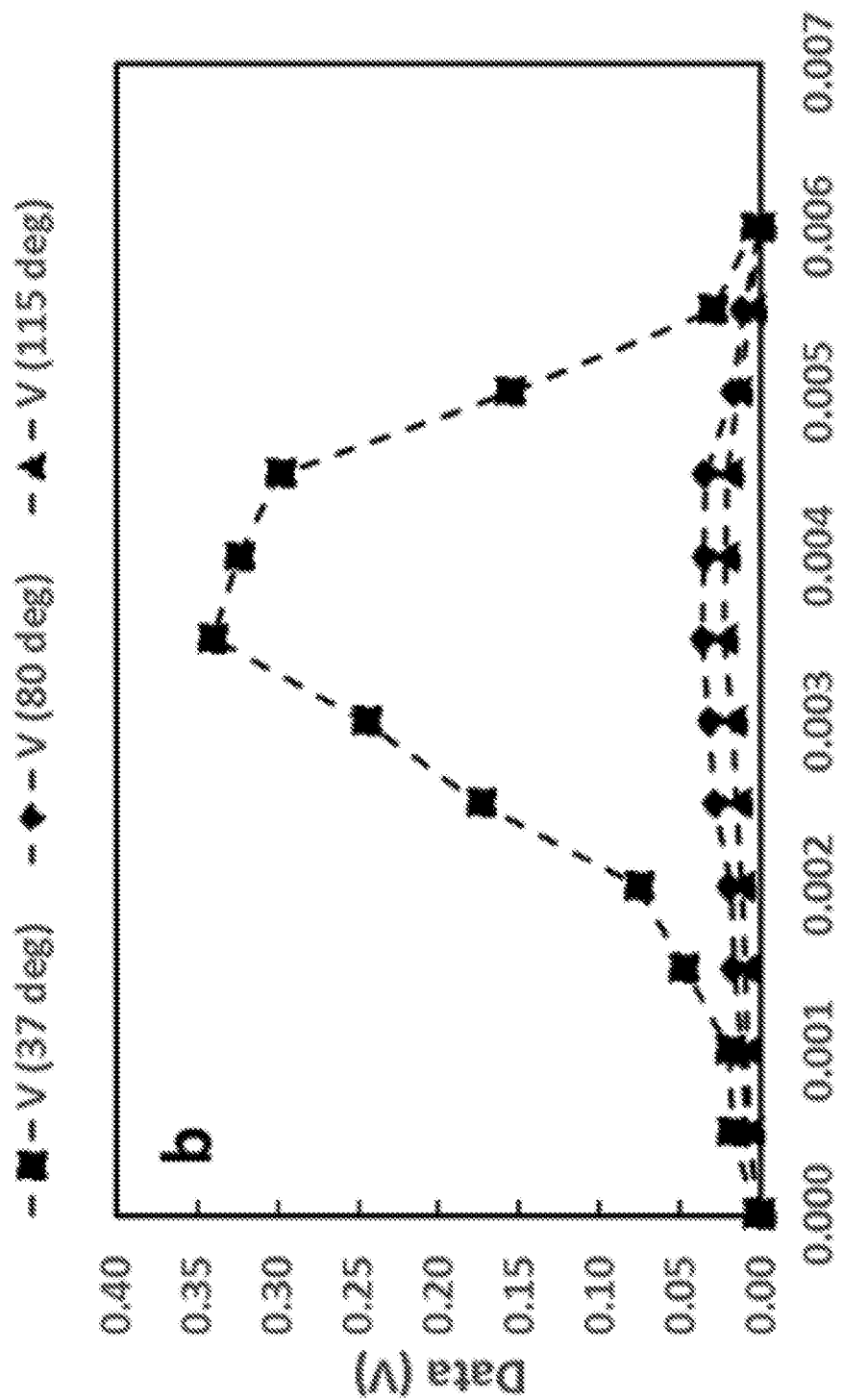
Figure 6C:
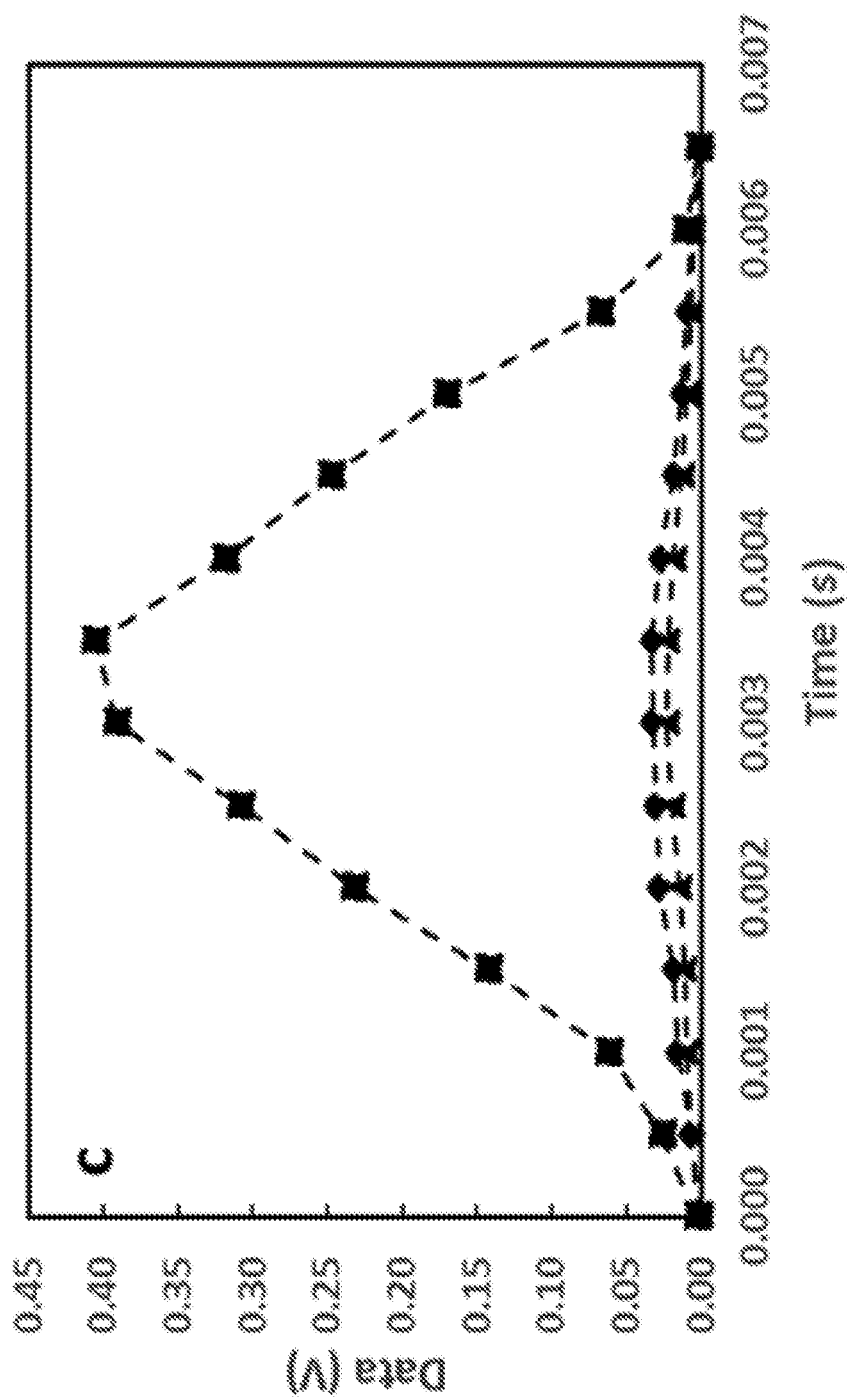
FIGS. 6c and 6d are charts of photodiode output versus time of flight for a 300 μm droplet of nigrosine/water solution at a ratio of 1:200.
Figure 6D:
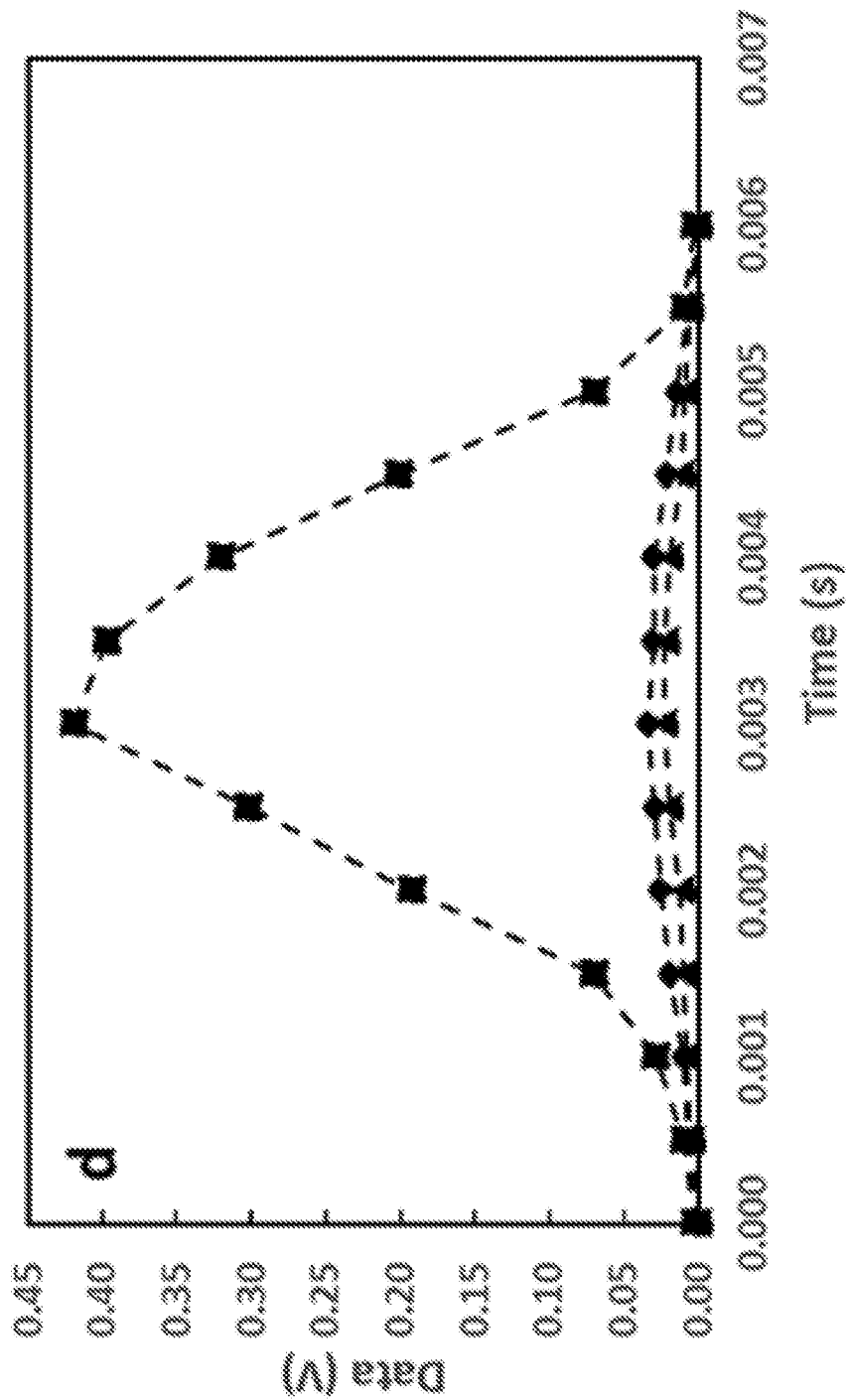

To validate this research and compare the experimental results to the theory, droplets of solutions of nigrosine to water, 300±10 μm in diameter of known n and were dropped using a nanofil syringe with a needle through the center of the beam, which was focused to 3 mm. The photodiodes positioned at 37°, 80°, and 115° scattering angles, recorded instantaneously the scattered-light intensity and time of flight for each droplet as shown in FIGS. 6a-d. FIGS. 6a and 6b chart photodiode outputs versus time of flight for a 300 μm droplet of nigrosine/water solution at a ratio of 1:150, and FIGS. 6c and 6d for a nigrosine/water solution at a ratio of 1:200. These data were selected based on the longest time of flight. Since the beam dimension was largest at the center, it was assumed the particles with the longest time of flight should have passed through the center. The velocity of the droplets was calculated as 0.485 mm/ms for the droplets being released at a height of 12 mm on the beam. With the beam dimension of 3 mm at the center, time of flight was about 6 ms for the particles to pass through the center of the beam. Since the photodiodes 46, 48, 50 were positioned at identical solid angles from the center of the beam, the droplets were dropped at the center of the beam. In this particular setup, if the droplets were dropped at any other positions of the beam, then the solid angles would increase/decrease with photodiode 46 and 50 and decrease/increase with photodiode 48 as they were positioned at two opposite sides of the beam. This would make the photodiodes record unexpected outputs. In these experiments, this geometry had to be considered due to the space restrictions for the photodiode stands/holders on the optical table. However, to build the actual device, it is possible to position all three photodiodes at one side of the beam since there will be no need for the photodiode stands/holders and the photodiodes will be unmounted as well.

Peak values of the output voltage and total time of flights for ten data sets including the ones in FIGS. 6a-d were used in Eqs. (13), (14), and (15) to iteratively solve for the droplet diameter, d, κkR, and n. Then, the predicted and the actual values were compared as summarized in Table 3. At most, it took six iterations for the models to converge.

TABLE 3

Comparison of actual to predicted values of droplet diameter, d, κkR, and n for nigrosine solution-to-water

| FIG. (Conc.) | $d_{actual}$ (±10 μm) | $d_{pred}$ (μm) | κkR$_{act}$ (±9%) | κkR$_{pred}$ | $n_{actual}$ | $n_{pred}$ | Uncertainty (%) d | κkR | n |
|---|---|---|---|---|---|---|---|---|---|
| 6.a (1:150) | 300 | 286.2 | 0.893 | 0.721 | 1.33 | 1.326 | −5 | −19 | −0.3 |
| 6.b (1:150) | 300 | 286.7 | 0.893 | 0.714 | 1.33 | 1.329 | −4 | −20 | 0 |
| N/A (1:150) | 300 | 275.5 | 0.893 | 0.747 | 1.33 | 1.336 | −8 | −16 | +0.45 |
| N/A (1:150) | 300 | 289.4 | 0.893 | 0.729 | 1.33 | 1.327 | −4 | −18 | −0.23 |
| N/A (1:150) | 300 | 285.5 | 0.893 | 0.732 | 1.33 | 1.318 | −5 | −18 | −1 |
| 6.c (1:200) | 300 | 292.2 | 0.766 | 0.612 | 1.33 | 1.313 | −3 | −20 | −1 |
| 6.d (1:200) | 300 | 296.7 | 0.766 | 0.615 | 1.33 | 1.311 | −1 | −20 | −1 |
| N/A (1:200) | 300 | 274.2 | 0.766 | 0.677 | 1.33 | 1.318 | −9 | −12 | −1 |
| N/A (1:200) | 300 | 272.5 | 0.766 | 0.653 | 1.33 | 1.317 | −9 | −15 | −1 |
| N/A (1:200) | 300 | 291.6 | 0.766 | 0.609 | 1.33 | 1.308 | −3 | −20 | −2 |
| RMS Average | | | | | | | 5.72 | 17.98 | 0.97 |

Figure 7A:
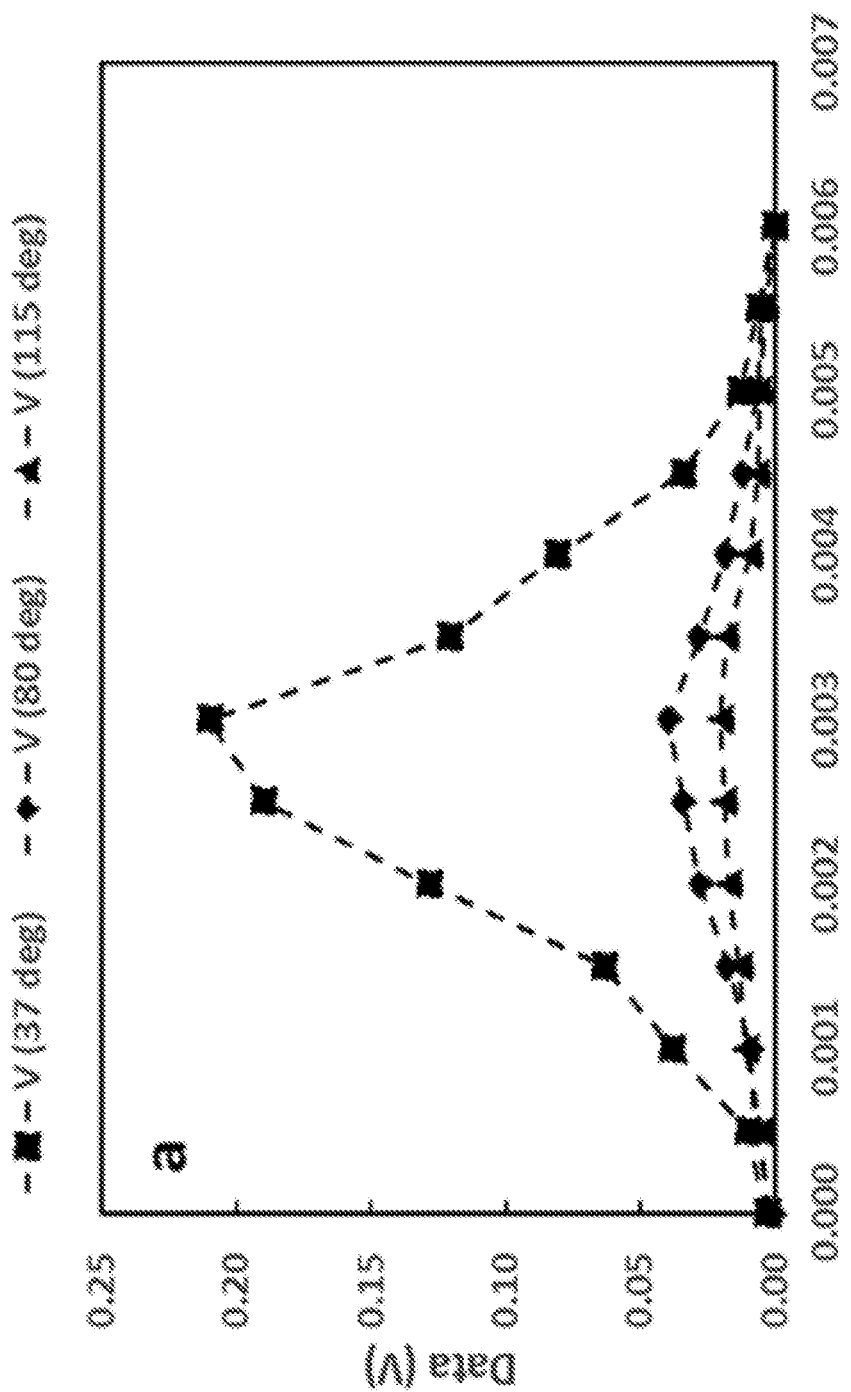
FIGS. 7a and 7b are charts of photodiode outputs versus time of flight for a 220 μm droplet of nigrosine/toluene solution at a ratio of 1:1350.
Figure 7B:
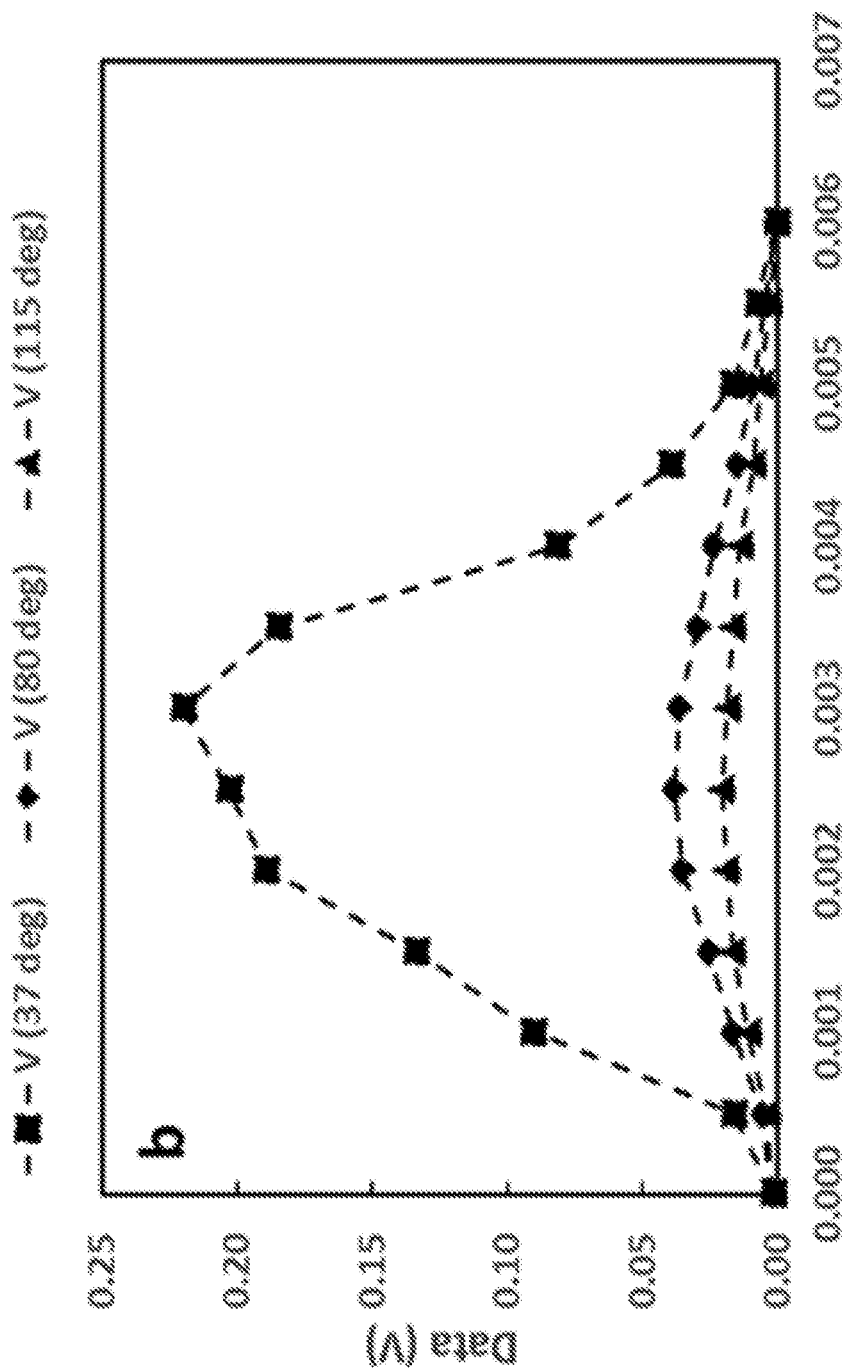
Figure 7C:
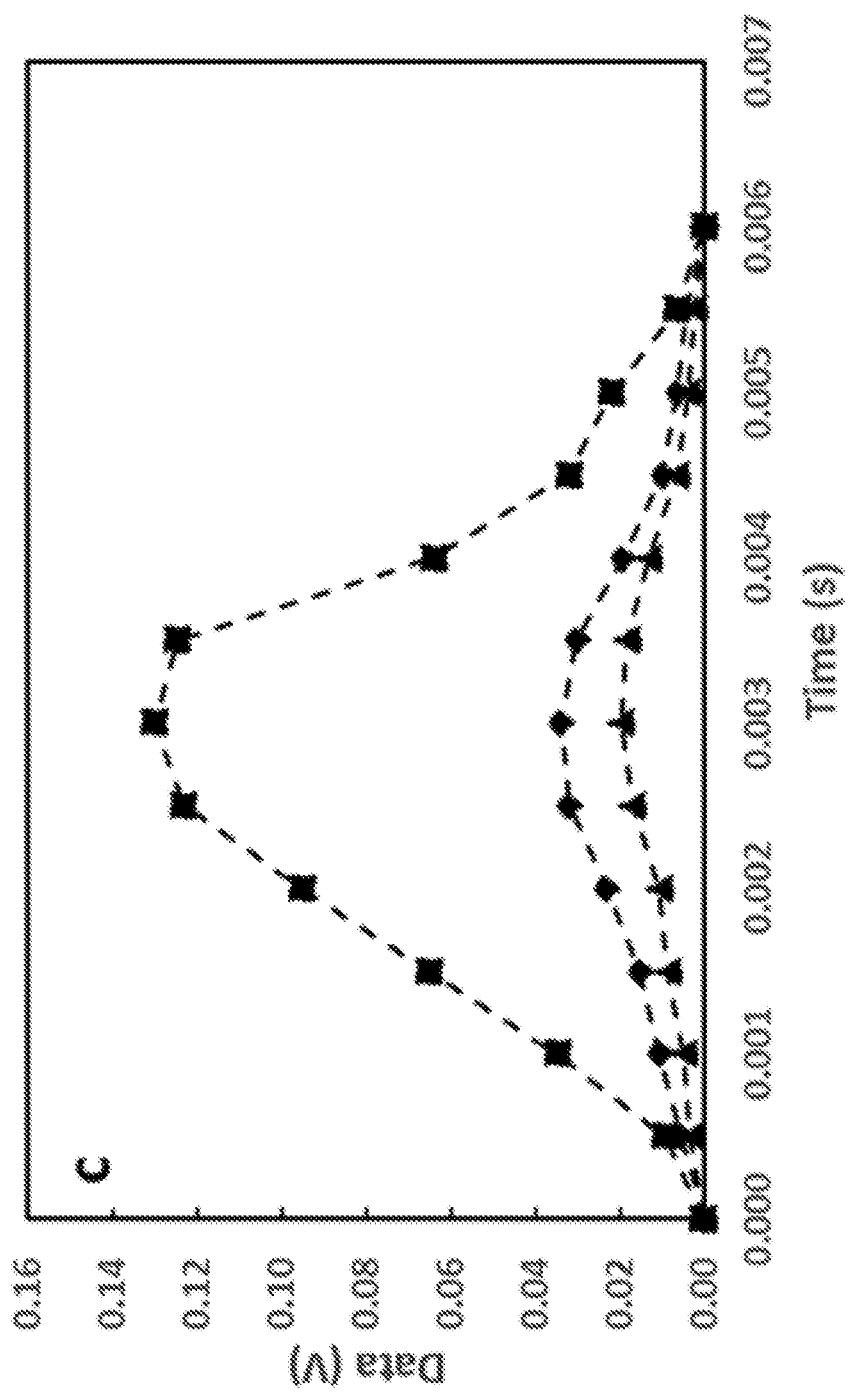
FIGS. 7c and 7d are charts of photodiode outputs versus time of flight for a 220 μm droplet of nigrosine/toluene solution at a ratio of 1:800.
Figure 7D:
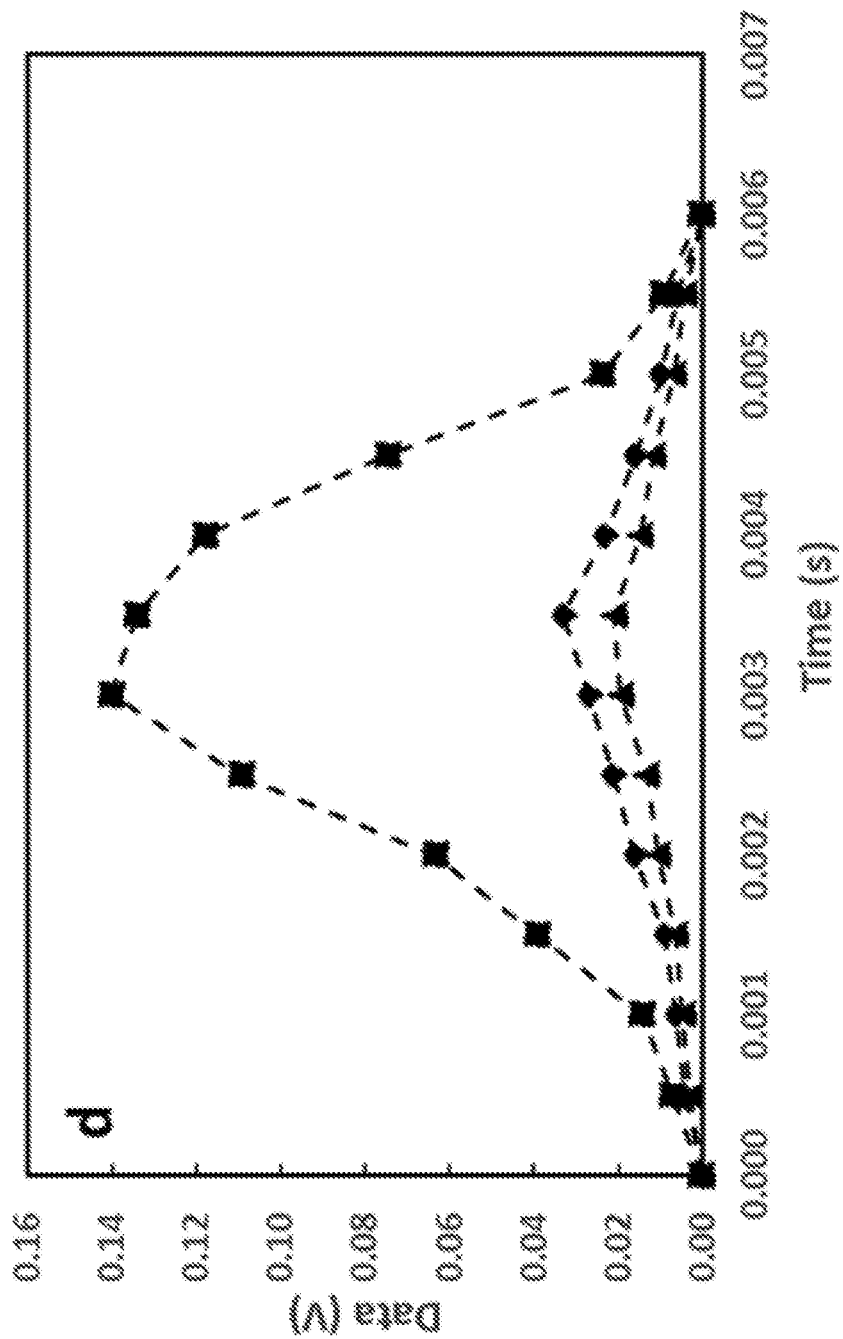

The same experiments were repeated for the droplets of the solutions of nigrosine to toluene 220±10 μm in diameter of known n and κ to check for the validity of our models for a different material with a different refractive index. The results are shown in FIGS. 7a-d and the predicted and actual values are compared in Table 4. FIGS. 7a and 7b chart photodiode outputs versus time of flight for a 220 μm droplet of nigrosine to toluene solution at a ratio of 1:1350, and FIGS. 7c and 7d for a nigrosine/toluene solution at a ratio of 1:800.

TABLE 4

Comparison of actual to predicted values of droplet diameter, d, κkR, and n for nigrosine-to-toluene solution

| FIG. (Conc.) | $d_{actual}$ (±μm) | $d_{pred}$ (μm) | $\kappa kR_{act}$ (±9%) | $\kappa kR_{pred}$ | $n_{actual}$ | $n_{pred}$ | Uncertainty (%) d | κkR | n |
|---|---|---|---|---|---|---|---|---|---|
| 7.a (1:1350) | 220 | 223.1 | 0.795 | 0.703 | 1.497 | 1.414 | +1 | −12 | −6 |
| 7.b (1:1350) | 220 | 228.3 | 0.795 | 0.742 | 1.497 | 1.402 | +4 | −7 | −6 |
| N/A (1:1350) | 220 | 214.5 | 0.795 | 0.738 | 1.497 | 1.404 | −2 | −7 | −6 |
| N/A (1:1350) | 220 | 216.6 | 0.795 | 0.742 | 1.497 | 1.431 | −2 | −7 | −4 |
| N/A (1:1350) | 220 | 218.6 | 0.795 | 0.707 | 1.497 | 1.411 | −1 | −11 | −6 |
| 7.c (1:800) | 220 | 207.8 | 1.104 | 0.992 | 1.497 | 1.44 | −6 | −10 | −4 |
| 7.d (1:800) | 220 | 217.7 | 1.104 | 1.194 | 1.497 | 1.428 | −1 | +8 | −5 |
| N/A (1:800) | 220 | 214.1 | 1.104 | 1.201 | 1.497 | 1.454 | −3 | +9 | −3 |
| N/A (1:800) | 220 | 205.1 | 1.104 | 1.242 | 1.497 | 1.488 | −7 | +13 | −1 |
| N/A (1:800) | 220 | 210.2 | 1.104 | 1.185 | 1.497 | 1.457 | −4 | +7 | −3 |
| Average | | | | | | | 3.7 | 9.4 | 4.7 |

The predicted droplet diameters are not uniform in size as can be seen in Tables 3 and 4. This is because the peak values of output voltages are different for the droplets as shown in their corresponding figures. The peak values of output voltages for smaller predicted droplets are obviously smaller than the ones for larger droplets.

The developed optical sensor determines the size and complex index of refraction of single particles simultaneously by measuring the scattered-light intensity of particles at three different scattering angles, i.e., 37±5°, 80±5°, and 115±5°. The mathematical models were validated by simultaneously measured the scattered-light intensities of 300 μm in diameter droplets of nigrosine solution-to-water and 220 μm in diameter droplets of nigrosine-toluene solution, with their known real and imaginary refractive indices, at the three scattering angles. The peak scattered intensities and total time of flights were used in the models to predict the diameter, and the real and imaginary parts of the refractive indices. The results were compared to the actual values as shown in Tables 3 and 4. For nigrosine solution-to-water droplets, on average, the uncertainties were ±5.1%, ±0.8%, and ±17.8% for diameter, real, and imaginary parts of the refractive index, respectively. For nigrosine-to-toluene solution droplets, on average, the uncertainties were ±3.1%, ±4.4%, and ±9.1% for diameter, real, and imaginary parts, respectively.

We claim:

1. Apparatus for determining one or more characteristics of a solid or liquid particle suspended within a fluid comprising:
    a laser configured to emit a laser beam;
    a collimating lens through which the laser beam is passed;
    a diamond-shaped aperture through which the laser beam passing through the collimating lens is directed and which is configured to form a modified laser beam having a diamond-shaped profile;
    a focusing lens through which the modified laser beam is passed;
    three photodetectors configured to detect light from the laser and passed through the focusing lens that is scattered by a particle passing through the laser beam and to generate three signals corresponding to information about the particle, wherein the three photodetectors are positioned at a scattering angles of 37°±5°, 80°±5°, and 115°±5°, respectively, and at identical solid angles from the center of the laser beam; and
    a processor operable to receive and record the signals from the three photodetectors and to simultaneously and iteratively solve a non-linear system of equations containing at least variables d, κkR, and n,
    wherein:
        d is the particle diameter,
        κ is the imaginary part of the refractive index,
        k is the wave number,
        R is the radius of the particle, and
        n is the real part of the refractive index,
        wherein κkR is equal to κπd/λ, where λ is the wavelength,
        wherein κ is calculated from the values of d and κkR obtained from the simultaneous and iterative solution of the non-linear system of equations, and
    wherein a respective signal received from each one of the three photodetectors is used as an input for a respective equation in the non-linear system of equations.

2. The apparatus of claim 1, wherein the three photodetectors are positioned on the same side of the laser beam.

3. The apparatus of claim 1, wherein the three photodetectors are positioned on opposite sides of the laser beam.

4. A method of determining one or more characteristics of a solid or liquid particle suspended within a fluid comprising:
    passing a laser beam through a collimating lens and then through a diamond-shaped aperture configured to modify a Gaussian profile of the laser beam and form a modified laser beam having a diamond-shaped profile;
    passing the modified laser beam through a focusing lens to form a focused laser beam;
    causing a particle to pass through the focused laser beam, the particle causing light from the modified laser beam to scatter;
    measuring the intensity of the scattered light and the time of flight of the particle through the modified laser beam using three photodetectors, wherein the three photodetectors are positioned at scattering angles of 37°±5°, 80°±5°, and 115°±5°, respectively, and at identical solid angles from the center of the laser beam, the three photodetectors outputting signals corresponding to information about the particle; and simultaneously and iteratively solving a non-linear system of equations containing at least variables d, κκR, and n, wherein:
d is the particle diameter,
κ is the imaginary part of the refractive index,
k is the wave number,
R is the radius of the particle, and
n is the real part of the refractive index,
wherein κκR is equal to λπd/λ, where λ is the wavelength;

calculating κ from the values of d and κκR obtained from the simultaneous and iterative solution of the non-linear system of equations, and wherein a respective signal received from each one of the three photodetectors is used as an input for a respective equation in the non-linear system of equations.

5. A method of monitoring an environment for the presence of particulate contaminants comprising:

directing a sample of a fluid comprising one or more particles into a particle characterization apparatus, the apparatus comprising a laser configured to emit a laser beam, a collimating lens through which the laser beam is passed, a diamond-shaped aperture configured to modify a Gaussian profile of the laser beam, a focusing lens, and three photodetectors configured to detect light from the laser that is scattered by the one or more particles when passing through the laser beam;

passing the laser beam through the collimating lens and then through the aperture to form a modified laser beam having a diamond-shaped profile;

passing the modified laser beam through the focusing lens to form a focused laser beam;

causing the one or more particles to pass through the focused laser beam, the one or more particles causing light from the focused laser beam to scatter;

measuring the intensity of the scattered light and the time of flight of the one or more particles through the focused laser beam using the three photodetectors, wherein the three photodetectors are positioned at scattering angles of 37°±50, 80°±5°, and 115°±5°, respectively, and at identical solid angles from the center of the laser beam, the three photodetectors outputting signals corresponding to information about the one or more particles; and simultaneously and iteratively solving a non-linear system of equations containing at least variables d, κκR, and n, wherein:
d is the particle diameter,
κ is the imaginary part of the refractive index,
k is the wave number,
R is the radius of the particle, and
n is the real part of the refractive index,
wherein κκR is equal to κπd/λ, where λ is the wavelength;

calculating κ from the values of d and κκR obtained from the simultaneous and iterative solution of the non-linear system of equations, and wherein a respective signal received from each one of the three photodetectors is used as an input for a respective equation in the non-linear system of equations.

6. The method of claim 5, wherein the environment being monitored comprises the interior of a vehicle.

7. The method of claim 6, wherein the environment comprises an aircraft cabin, and the gas comprises bleed air from at least one aircraft engine.

* * * * *